(12) United States Patent
Gaur et al.

(10) Patent No.: US 10,496,413 B2
(45) Date of Patent: Dec. 3, 2019

(54) EFFICIENT HARDWARE-BASED EXTRACTION OF PROGRAM INSTRUCTIONS FOR CRITICAL PATHS

(71) Applicant: INTEL CORPORATION, Santa Clara, CA (US)

(72) Inventors: Jayesh Gaur, Bengaluru (IN); Pooja Roy, Bangalore (IN); Sreenivas Subramoney, Bangalore (IN); Hong Wang, Santa Clara, CA (US); Ronak Singhal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 15/433,674

(22) Filed: Feb. 15, 2017

(65) Prior Publication Data

US 2018/0232235 A1    Aug. 16, 2018

(51) Int. Cl.
*G06F 9/30* (2018.01)
*G06F 9/38* (2018.01)
*G06F 8/41* (2018.01)

(52) U.S. Cl.
CPC .............. *G06F 9/3838* (2013.01); *G06F 8/41* (2013.01)

(58) Field of Classification Search
CPC ................................ G06F 8/433; G06F 9/3838
See application file for complete search history.

(56) References Cited

U.S. PATENT DOCUMENTS

| | | | |
|---|---|---|---|
| 2004/0003215 A1* | 1/2004 | Krimer | G06F 9/3848 712/235 |
| 2012/0173832 A1* | 7/2012 | Post | G06F 12/0246 711/165 |
| 2015/0046684 A1* | 2/2015 | Mehrara | G06F 8/45 712/220 |

OTHER PUBLICATIONS

Tune, "Critical-Path Aware Processor Architecture", 2004, 188 pages.*

(Continued)

*Primary Examiner* — David J. Huisman
(74) *Attorney, Agent, or Firm* — Lowenstein Sandler LLC

(57) ABSTRACT

A processor includes a memory to hold a buffer to store data dependencies comprising nodes and edges for each of a plurality of micro-operations. The nodes include a first node for dispatch, a second node for execution, and a third node for commit. A detector circuit is to queue, in the buffer, the nodes of a micro-operation; add, to determine a node weight for each of the nodes of the micro-operation, an edge weight to a previous node weight of a connected micro-operation that yields a maximum node weight for the node, wherein the node weight comprises a number of execution cycles of an OOO pipeline of the processor and the edge weight comprises a number of execution cycles to execute the connected micro-operation; and identify, as a critical path, a path through the data dependencies that yields the maximum node weight for the micro-operation.

22 Claims, 13 Drawing Sheets

(56) References Cited

OTHER PUBLICATIONS

Nagarajan et al., "Critical Path Analysis of the TRIPS Architecture", 2006, 11 pages.*
Dooley et al., "Detecting and Using Critical Paths at Runtime in Message Driven Parallel Programs", 2010, 8 pages.*
Fields et al., "Focusing Processor Policies via Critical-Path Prediction," ISCA '01 Proceedings of the 28th annual international symposium on Computer architecture, 12 pages, Jun. 1, 2001.
Tune et al., "Quantifying Instruction Criticality," 11th International Conference on Parallel Architectures and Compilation Techniques (PACT), 11 pages, Sep. 2002.

* cited by examiner

EFFICIENT HARDWARE-BASED EXTRACTION OF PROGRAM INSTRUCTIONS FOR CRITICAL PATHS

TECHNICAL FIELD

The present disclosure relates to critical path determination, and in particular, to hardware buffering of data dependencies between micro-operations to determine a critical path through a computer program.

BACKGROUND

Single thread performance of a processor is limited by the length of the critical path. The critical path is a path of a software program that is longest in terms of latency, e.g., the chain of instructions that slow down the program or stall its processing. These instructions are decoded into what are referred to as micro-operations (or µops). The dynamic instances of micro-operations that lie on this critical path limit the performance of an out-of-order (OOO) processor. Micro-operations that do not lie on the critical path do not affect performance. Hence, correctly identifying these critical µops and devoting additional resources to accelerating only this potentially small subset of critical µops can substantially improve the performance of execution, as compared to accelerating all µops.

DESCRIPTION OF EMBODIMENTS

Figure 1:
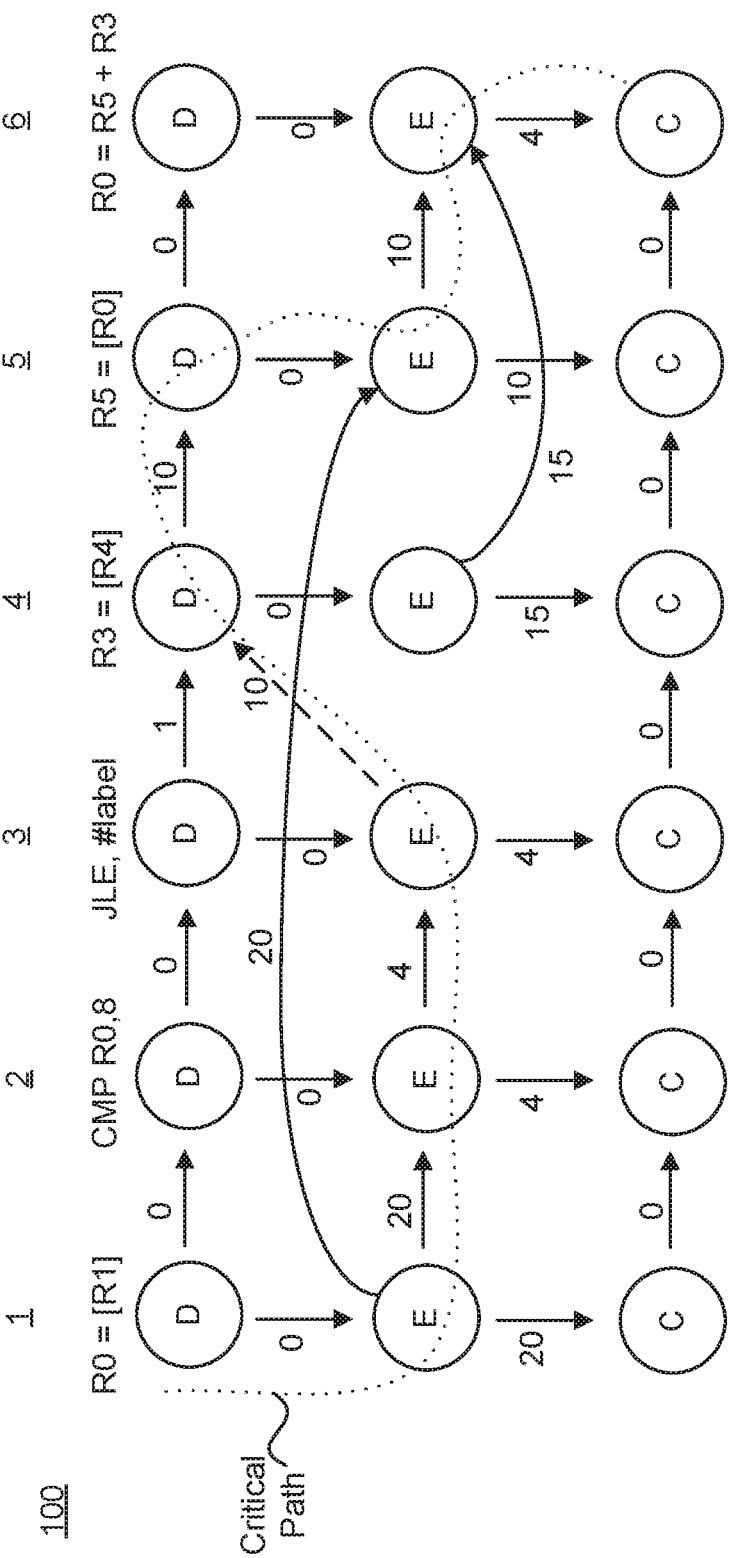
FIG. 1 is a block diagram of a data dependency graph (DDG) illustrating data dependencies between micro-operations of a software program, according to an embodiment of the present disclosure.

Although identifying critical micro-operations (µops) of a decoded software program can substantially improve the execution of an out-of-order (OOO)-pipelined processor, identifying a critical path through the µops can be particularly challenging, but may be required to accurately identify the critical µops. For example, rarely does a single critical path exist, and thus, there are usually multiple critical paths. In such a case, to substantially improve performance, the multiple critical paths are accelerated together. For example, it is useful to dynamically identify new critical path(s) once a previously-identified critical path has been accelerated. Dynamic detection of critical µops may lead to significant performance optimizations.

Furthermore, different instances of a static µop may be critical or non-critical at different times. For criticality-based optimization, the critical instances of the µops are dynamically changing and should be determined correctly when they are in fact critical. Additionally, or alternatively, there could be a large number of static µops that constitute the critical path. Storing information about these static µops demands a large table or hashing schemes that can be prohibitively expensive in terms of hardware and processing power to implement. A criticality detector should have a moderate hardware requirement such that the drawbacks to identifying critical µops do not outweigh the performance benefits.

Disclosed is a hardware solution with a low hardware requirement (e.g., less than 10 KB of storage space to buffer data dependencies and data structures in some implementations) and which detects critical paths dynamically, without interfering with execution of the processor. Results indicate that this detection mechanism outperforms known heuristics-based criticality detection mechanisms (almost twice the speed increase in some cases). The identified critical instructions may be exposed via enhanced performance monitoring hardware and support profiling tools like the VTune™ available with Intel® processors.

In various embodiments, a processor may include a local memory in which to hold a buffer such as a first-in-first-out (FIFO) buffer or the like buffer. The buffer may be used to store data dependencies of the micro-operations of decoded instructions of a software program. The data dependencies may be represented in data as nodes and edges of the micro-operations, where edges connect between nodes, including connections between dependent micro-operations. At least three types of nodes may be stored, one each for dispatch, execution, and commit stages of the OOO pipeline. The data dependencies may be instantiated in what is sometimes termed as a data dependency graph (DDG) or the like. In order to detect critical paths dynamically, the nodes and edges of each micro-operation entering an instruction queue may be added to the buffer. This may occur during allocation of the micro-operations, and continue to be tracked during OOO execution, and also for the most-recently retired micro-operations.

In various embodiments, the processor may include a criticality detector circuit coupled to the local memory that interacts with the buffer to determine critical path(s) through the micro-operations stored within a window of a set number ("n") of the buffered micro-operations. In one embodiment, the window is of a size defined by the number of retired operations stored in the buffer, but can also be of a different size in other embodiments. While a larger buffer would allow more efficient critical path determination, a balance may be struck between size and hardware requirements. When a micro-operation is queued for allocation, the nodes of the micro-operation may also be buffered and connected into the DDG of the buffer.

The criticality detector circuit may then determine a node weight for each of the nodes of the micro-operation, which may be stored with each respective node. The node weight may be determined by adding an edge weight to a previous node weight of a connected micro-operation that yields a maximum node weight for the node. In various embodiments, a weight may be a number of execution cycles of the OOO pipeline and the edge weight may be a number of execution cycles to execute the connected micro-operation. The node weight, therefore, may be the maximum number (e.g., worst case) of OOO execution cycles to complete the micro-operation from the start of the first micro-operation in the buffer or at the start of the "n" micro-operations under consideration. The criticality detector circuit may then identify, as the critical path, a path through the data dependencies that yields the maximum node weight for the commit node of the micro-operation. This determination may occur every "n" micro-operations within the DDG, and thus be performed for a rotating window of micro-operations passing through the buffer. The tracing may therefore span "n" number of μops, where "n" may be the size of the retired μops stored in the buffer, in one embodiment. A program address of (or other reference to) the micro-operations having a node along this critical path may be stored in a critical instruction pointer (IP) data structure such as an IP table that lists references to these critical micro-operations, where IP makes reference to program address.

Alternatively, or additionally, the criticality detector circuit may identify, in the data dependencies, one or more second micro-operations on which critical micro-operations depend, the critical micro-operations being located along the critical path of the data dependencies. The criticality detector circuit may then also store an address of the one or more second micro-operations in the critical entry IP data structure. These second micro-operations, for example, may be located along a dependency slice taken backwards through the program from a critical micro-operation through earlier dependent micro-operations. Dependent micro-operations may be micro-operations having connected execution nodes where the earlier micro-operation provides data to the later micro-operation to use in its execution. In one embodiment, only references to critical micro-operations of these dependency slices are stored for use in instruction acceleration, to reduce the memory size that would otherwise be required to store all micro-operations identified as critical.

For purposes of explanation only, Table 1 illustrates a small number of six μops as an example, showing the assembly code, the type of instruction, time of dispatch of each μop, the number of cycles to execute (T) each μop, and a time at which each μop retires.

TABLE 1

| μop | Assembly | Type | Dispatch | Exec. Time | Retire |
|---|---|---|---|---|---|
| 1 | R0 = [R1] | Load | T = 0 | 20 | T = 20 |
| 2 | CMP R0, 8 | Compare | T = 0 | 4 | T = 24 |
| 3 | JLE #label | Branch Mis-Prediction | T = 0 | 4 (JECLEAR = 10) | T = 28 |
| 4 | R3 = [R4] | Load | T = 34 | 15 | T = 49 |
| 5 | R5 = [R0] | Load | T = 44 | 10 | T = 54 |
| 6 | R0 = R5 + R3 | ADD | T = 44 | 4 | T = 58 |

Accordingly, the R0 register may act as an intermediate address register, loading the data for address [R1] in execution of μop one. The compare of μop two cannot execute before time T=20 because the result depends on the value in R0. Accordingly, the time to retire μop two stretches out to T=24. The JLE of μop three stands for "Jump Less Than or Equal," meaning to take the jump if the value in R0 is less than or equal to 8 (see μop two), and thus is a predictive branch. For purposes of this example, assume the branch was mispredicted, causing a JECLEAR, or "Jump Execution-Based Clear," to flush all data after the jump μop. With this assumption, there is a 10-cycle delay, meaning that μop four is not dispatched until T=34 (or 24+10). For purposes of the critical path, the misprediction is assumed because it causes the longest delay. Note that μop four is again a load, this time of address [R4] into register R3, but is not critical for the program because its execution is hidden behind the parallel execution of μop five. There is a delay assumed of 10 cycles, however, for the possibility of a cache miss, as a worse-case estimate, during the data fetch. The final and sixth μop is an addition operation that requires the data from the load μops three and four, meaning μop six cannot proceed until, worst case, T=44, and may not retire until, worse case, T=58. Accordingly, the critical path is the path ending with the T=58 retirement of μop six.

To allow circuitry to detect the critical path, a processor may convert the micro-operations of Table 1 into a DDG as illustrated in FIG. 1. FIG. 1 is a block diagram of a DDG 100 illustrating data dependencies between micro-operations of the decoded software program of Table 1, according to an embodiment of the present disclosure. The data dependencies include the nodes and edges connecting the nodes, as illustrated with circles (nodes) and arrows (edges). The nodes are of three different types, labeled as "D" indicating the dispatch stage, "E" indicting the execution stage, and "C" indicating the commit stage. Note the six μops are ordered from left to right, meaning that time is also flowing from left to right. The critical path is the longest path, indicated by the dotted line. The dark, thick lines indicate edges between execution nodes, e.g.,E-E edges. The dashed line between the E node of μop three and the D node of μop four indicates a misprediction of a control transfer instruction, which in this case is a jump μop. The misprediction path is the longest, which is the path follow along the critical path.

The DDG 100 may be implemented in hardware for an accurate identification of the critical path. Determining the area needed for the data dependencies of the DDG as well as the complexity of traversing the DDG to find the critical path in hardware are non-trivial. The DDG 100 of FIG. 1 will be revisited with reference to FIG. 3.

Figure 2A:
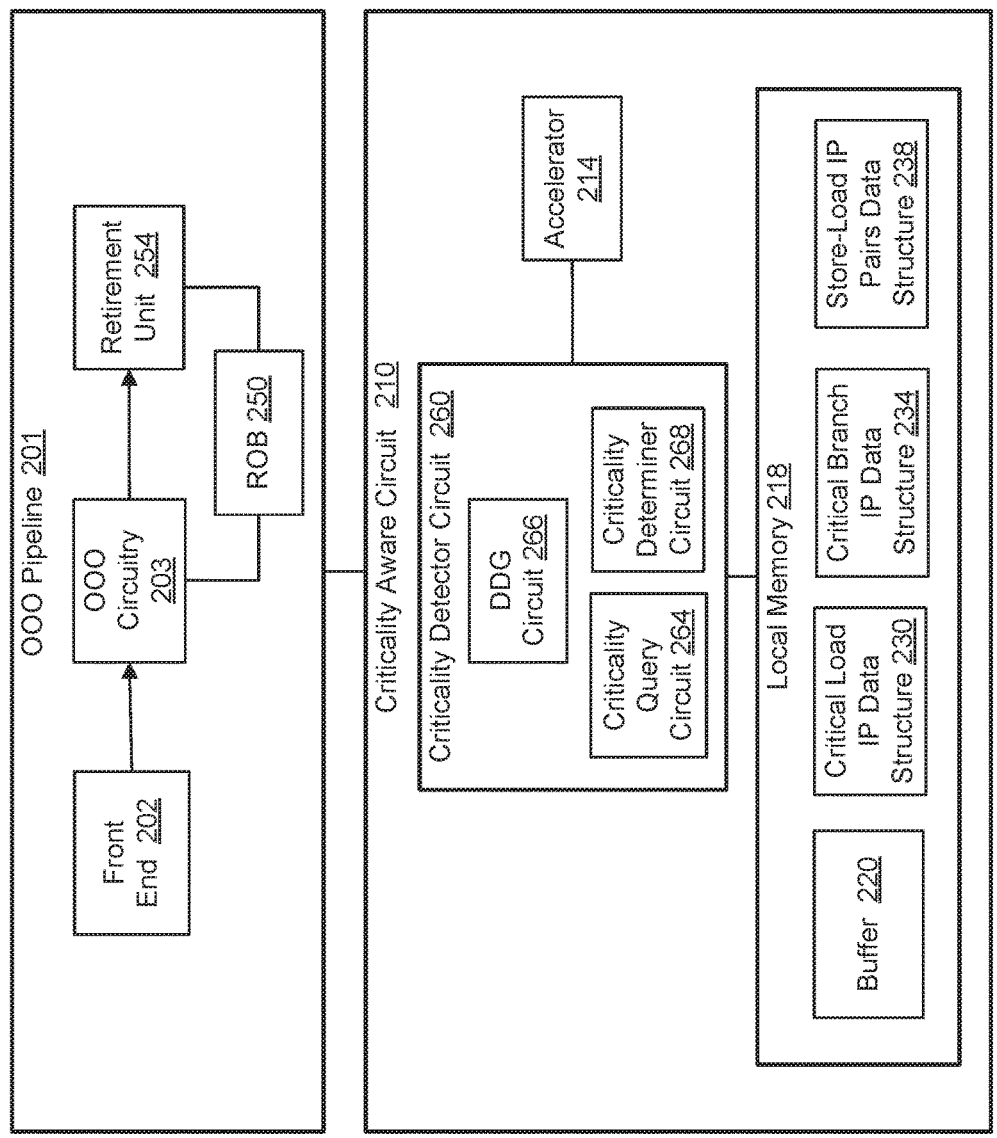
FIG. 2A is a block diagram of a processor with an out-of-order pipeline and criticality aware circuit, according to an embodiment of the present disclosure.
Figure 2B:
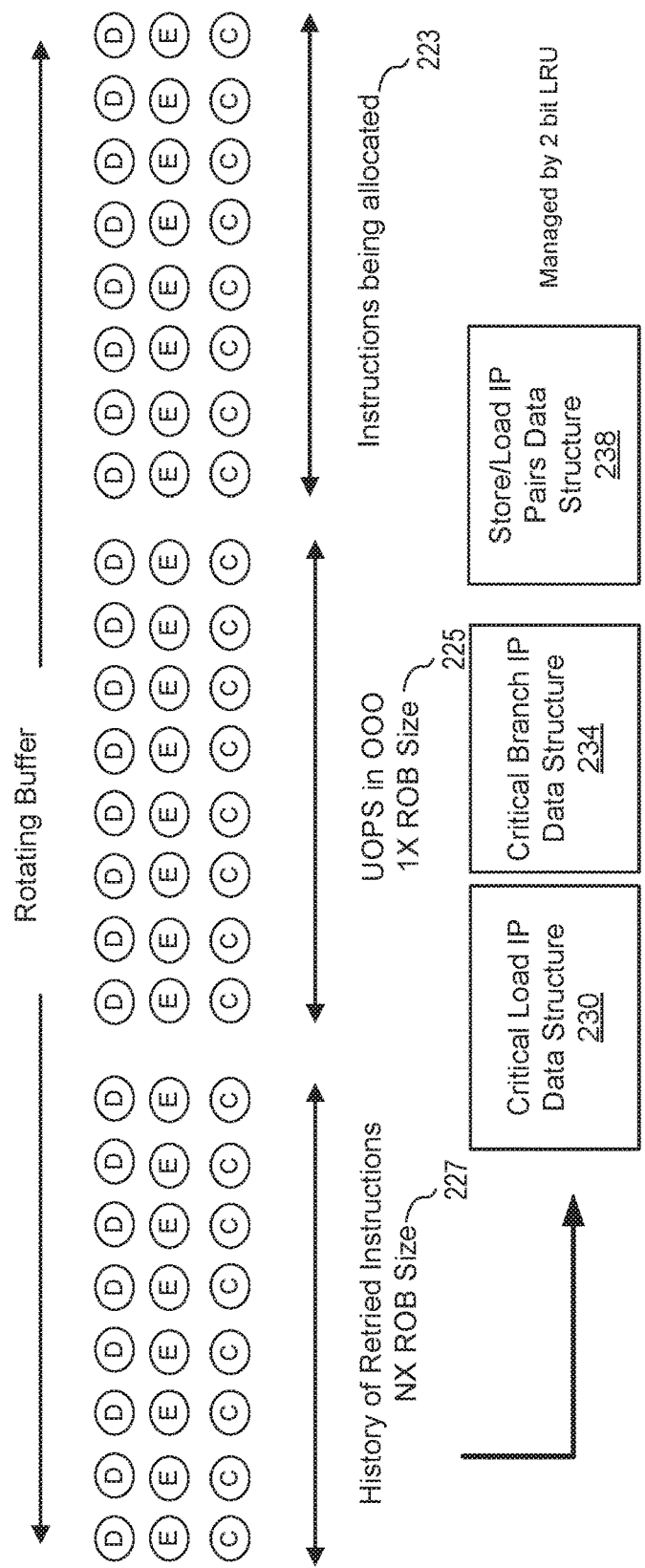
FIG. 2B is a functional block diagram of the buffer and data structures of FIG. 2A, according to an embodiment of the present disclosure.

FIG. 2A is a block diagram of a processor 200, or system-on-a-chip (SoC), that includes an out-of-order pipeline 201 and a criticality aware circuit 210, according to an embodiment of the present disclosure. The OOO pipeline 201 may include, for example, a front end 202, OOO circuitry 203 (for issuing and executing micro-operations), a reorder buffer (ROB) 250, and a retirement unit 254. Note that FIGS. 6A-6B also discuss an OOO pipeline in more detail and will not be repeated here. FIG. 2B is a functional block diagram of the buffer and data structures of FIG. 2A. The criticality aware circuit 210 may include but not be limited to an accelerator 214, local memory 218, and a criticality detector circuit 260. The accelerator 214 may be used to accelerate critical micro-operations, once determined, to be located along a critical path or to be on a dependent slice taken backwards through the DDG 100 from another critical μop.

In various embodiments, the local memory 218 may be a Static Random Access Memory (SRAM) chip, one or more register files, some other cache-like memory, or a combination thereof. The local memory 218 may store, for example, a buffer 220, a critical load instruction pointer (IP) data structure 230, a critical branch IP data structure 234, and a store-load IP pairs data structure 238. The data structures 230, 234, and 238 may be instantiated as tables, buffers, or counters, for example.

In various embodiments, the buffer 220 may be a first-in-first-out (FIFO) buffer, a rotating buffer, a ring buffer, or other type of channel-based storage. With additional reference to FIG. 2B, the buffer 220 may be sectioned into three parts: a first section 223 for storing μops being allocated in the OOO pipeline 201, a second section 225 for storing μops that are under execution by the OOO circuitry 203 of the OOO pipeline 201, and a third section 227 for storing a history of the most-recently-executed, retired μops. In one embodiment, the second section is sized as the same as the ROB 250 of the OOO pipeline 201, and the third section is sized as two times the ROB in size, but other multiples may be used in other embodiments.

In various embodiments, the criticality detector circuit 260 may include, but not be limited to, a criticality query circuit 264, a DDG circuit 266, and a criticality determiner circuit 268. When a micro-operation is allocated in the OOO pipeline 201, the DDG circuit 266 may add the micro-operation, and thus its nodes and edges, to the DDG 100 stored in the buffer 220 (FIG. 1). Each micro-operation may be added sequentially in program order, but the edges may connect to nodes of earlier dependent micro-operations, for example, as illustrated between E nodes of μops one and five of the DDG 100. Other edges are added to connect nodes of a connected micro-operation that occurs sequentially in program order, as illustrated between adjacent D nodes of the μops of the DDG 100. The ability of the DDG circuit 266 to continually update the data dependencies stored in the buffer 220 provide for dynamic critical path determination while the software program is executed by the OOO pipeline 201.

As every "n" micro-operations retire, the criticality determiner circuit 268 may trace the data dependencies backwards in time to determine the critical path(s) of those "n" predetermined number of buffered micro-operations. In one embodiment, the "n" micro-operations may be defined by the number of retired μops stored in the buffer 220. The trace may start with the C node of the most-recent μop and end with the D node of the oldest μop of the "n" predetermined μops, determining which paths through the data dependencies are the longest. This may be performed as will be discussed later with reference to FIG. 3.

In various embodiments, the critical IP data structure 230 stores references to critical load μops, the critical branch IP data structure 234 stores references to critical branch (e.g., control transfer) μops, and the store-load IP pairs data structure 238 stores pairs of IPs, one of which references a critical load micro-operation and the other that references a store micro-operation on which the critical load μop depends. These references may be addresses (e.g., IP's) of the μops or some other mapping to the IPs that correspond to μops that have been seen, in the past, to be critical or have been determined to be critical through machine learning or the like. Again, critical μops are those that cause the OOO pipeline 201 to stall or slow down. Because of the nature of the store-load IP pairs data structure 238 also includes critical load μops, some of the entries in the store-load IP pairs data structure 238 may duplicate critical load μops stored in the critical load IP data structure 230.

Once the criticality determiner circuit 268 identifies a critical path, the detector circuitry 260 may store a reference to the μops located along the critical path in at least one of the data structures 230, 234, and 238. The reference to those μops may be their IP-based addresses or other reference. Under an additional or alternative embodiment, the criticality determiner circuit 268 may identify a dependent slice from certain types of critical μops such as critical load misses, critical branches, and critical long latency arithmetic operations. In this embodiment, the criticality determiner circuit 268 may trace dependent μops backwards in the program, where these certain types of critical μops depend on the dependent μops. The criticality determiner circuit 268 may then store these dependent μops in at least one of the data structures 230, 234, and 238. The critical μops stored in the store/load IP pairs data structure 238 may help form a more-accurate dependent slice for a current critical load μop much earlier in the OOO pipeline 201, even when the address of the critical load μop is not yet known.

The criticality query circuit 264 (or other processor circuitry) may be designed to query the IP data structures 230, 234, and 238 to determine whether a new μop coming into an instruction queue is determined to be critical. When a μop is identified as being critical, the accelerator 214 may interact with the OOO pipeline 201 to accelerate processing of the critical μop. Accelerator hardware of the accelerator 214 may also be located elsewhere in various embodiments, including possibly integrated with or as a part of the OOO pipeline.

Accordingly, to detect critical uops, the criticality detector circuit 260 relies on a concisely-buffered DDG that contains data dependencies for micro-operations of a program for execution by the OOO pipeline 201. Each entry of the DDG may correspond to a ROB entry and may have the three nodes already discussed: D, E, and C nodes. Table 2 shows the area (in bits) needed to store one entry in the DDG, according to one embodiment of the present disclosure. Although different numbers of bits may be used for some edge types, the example of Table 2 is an attempt to minimize the number of required bits. The disclosed example would need only 4.5 bytes per entry. Both register and memory dependencies may be recorded in the DDG.

TABLE 2

| Edge Type | Description | Bits Needed |
| --- | --- | --- |
| D-D, C-C, D-E, C-D | In order dispatch (D-D), in-order commit (C-C), dispatch to execute (D-E), depth limitation (C-D) | 0 (implicit edges) |
| E-C | Execution latency | 3 bits (quantized) |
| E-E | Data dependency with a node | 10 bits * 3 (sources) + 10 bits (memory dep.) = 40 b |
| E-D | Bad speculation | 1 bit (to signify) |

The criticality detector circuit 260 may also need a 6B instruction address (IP) that may be stored per DDG entry (for identification). Instead of devoting a 6B per entry, the criticality detector circuit 260 may store the index of the IP table along with a 5 bit offset with every DDG Node. Assuming a 32-entry IP table and 5-bit offset, the criticality detector circuit 260 may track 1,024 IPs. Each DDG entry may therefore need an additional 10 bits.

Now, assume a history length of "N" times the ROB size (227 in FIG. 2B). To capture the depth of the machine, N is to be greater than or equal to two. Assuming N=2, the overall area of the graph buffering would be around 8 KB for a ROB size of 352. To make sure that finding the critical path does not affect the execution of the processor, the DDG may buffer μops that are executing in the ROB 250 or allocated and waiting to be sent to the ROB. In this way, the criticality detector circuit 260 is afforded several more cycles while learning the critical path form the history of retired μops, e.g., while new μops continue to be allocated.

Accordingly, the criticality detector circuit 260 may learn one or more critical path from the history of retired μops 227, and therefore identify μops with an E node on the critical path. Traversing the critical path, however, is a complex problem and would need an iterative depth search, which is not implementable in hardware. To make the graph hardware-search friendly, the criticality detector circuit 260 may add a 10-bit node weight, which is deployed for the nodes illustrated in FIG. 3.

Figure 3:
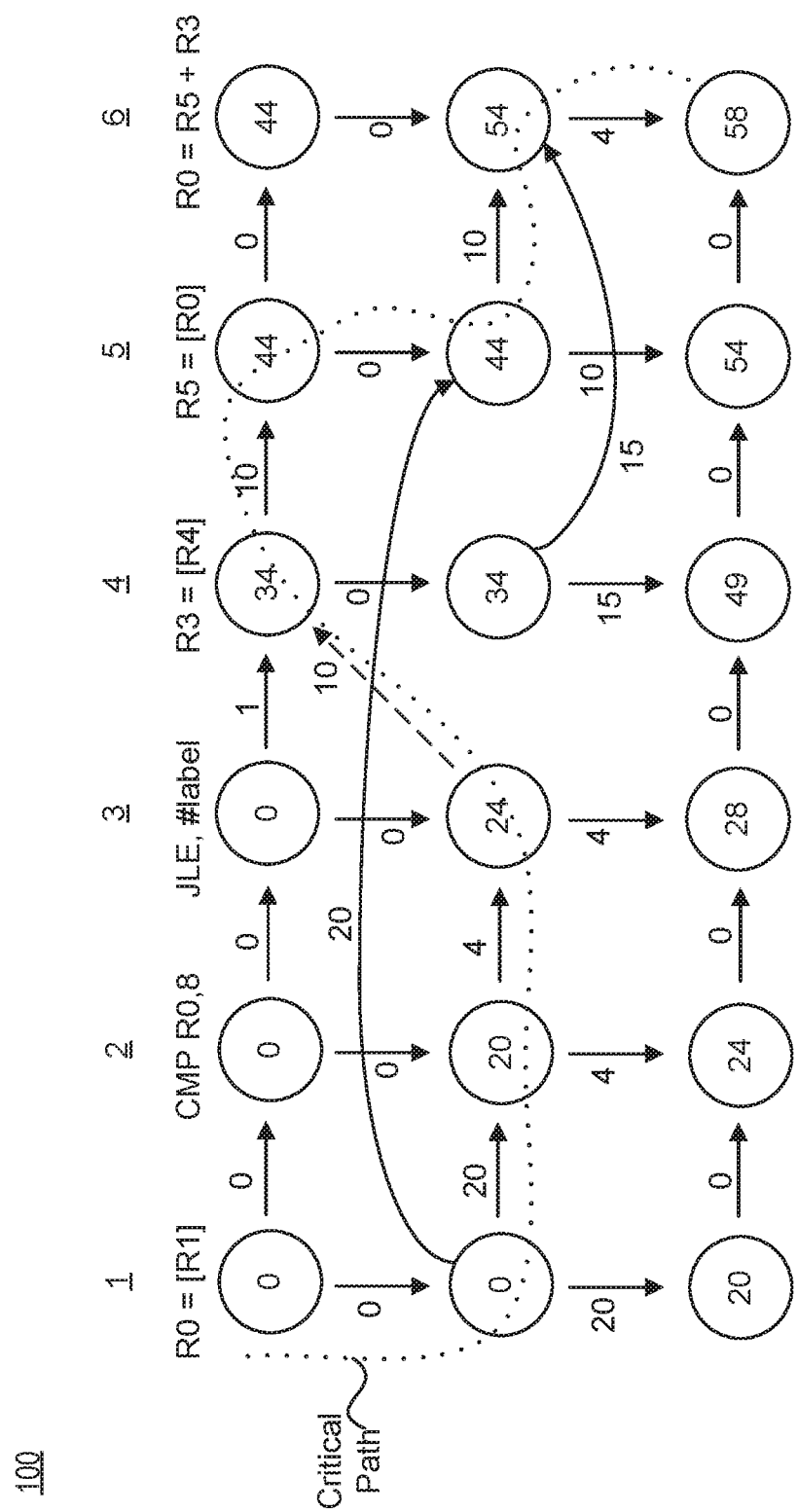
FIG. 3 is a block diagram of the DDG of FIG. 1 after calculation of a node weight for each of the micro-operations of the DDG, according to an embodiment of the present disclosure.

FIG. 3 is a block diagram of the DDG 100 of FIG. 1 after calculation of the node weight for each of the micro-operations of the DDG 100, according to an embodiment of the present disclosure. The node weight may signify the distance from the beginning of the DDG or the beginning of the "n" sized window of μops under consideration. This node weight may be stored for each of the D, E, and C nodes (30 bits). The node weight for a given node, for example, may be expressed as max (Node-weight[j]+edge[j]), where j is the previous node with which the node has an edge.

Accordingly, in FIG. 3, the node weight for the E node of μop two is 20 because the node weight of the E node of μop one to which it is connected is zero ("0") and the edge weight is 20. The edge weight may be the number of OOO cycles it takes, worst case, to complete execution of the previous μop, e.g., μop one here. This process continues for μop three, which E node weight is now is 20+4=24. The worst case scenario is to follow the misprediction to μop four, so the node weight of the D node of μop four is the addition of the E node weight (of μop three), or 24, plus the edge weight of 10 of the misprediction path, yielding a node weight of 34. This means that the E node of μop four only has a D-E edge back to its D node, and now has a node weight of 34. As is evident, the node weight may sometimes depend on a μop that is not an adjacent μop, and thus having a sufficiently large window of μops within the buffer allows more-accurate critical path determination where dependent μops may be very far away. By following this process, a node weight is determined for each node along the critical path, ending with a node weight of 58 for the C node of μop six.

In various embodiments, for each node, the criticality detector circuit 260 may store the node weight with an edge index value that indicates which edge has to be taken for this maximum node weight. In one embodiment, the edge index value is two bits in size, but can vary depending on the size of the DDG. As soon as a node is added to the buffer 220, its node weight may be calculated along with the edge index value for the next node, and the node weight and edge index value may both be recorded in the buffered DDG for that node. In one embodiment, the critical detector circuit 260 may repurpose the 40 bits of E-E edges (stored earlier) for also storing the node weight, and thus need not incur any additional latency. In a further embodiment, these 40 bits may also be used for storing the edge index value. The critical path may then be traced starting from the C node of the last μop (e.g., the μop that has just been added to the DDG) and continually hopping to the node which is denoted by the edge index value, until reaching the D node of the first μop, e.g., the D node of the first of the "n" μops. Performing this traversal of the DDG 100 follows the dotted line, which is the critical path identified in the DDG 100 as noted with reference to FIG. 1.

The μops having an E node lying on the critical path may be deemed critical and are marked as such, e.g., by storing a reference to the μop in one of the data structures 230, 234, and 238, as illustrated in FIG. 2B. In various embodiments, when any node weight reaches saturation, all node weights may be halved. Since only the relative distance matters, halving node weights does not introduce any approximation. To avoid traversal time in hardware, as soon as a new entry is committed and enters the DDG, the criticality detector circuit 260 may check whether the entry just before it was on the critical path. If it is, then the criticality detector circuit 260 can mark the previous entry as critical. If the E node of this newly marked critical μop has an E-E edge, then all μops between the two E nodes are non-critical and their criticality bit may be reset, e.g., reference to these μops may be removed from one or more of the data structures 230, 234, and 238. This is the case because these intermediate E nodes may be executed out of order, independently and do not add to the latency of execution.

Instead of storing the IP (program address) of every μop that is flagged critical, the criticality detector circuit 260 may store only the IP of critical load misses, critical branches, and critical long-latency arithmetic operations, and their respective dependent slices. For example, when a new critical load, branch or long-latency arithmetic is added to the OOO circuitry 203, the criticality detector circuit 260 may traverse its dependent slice backwards in the DDG and mark the μops on the dependent slice as critical. The dependent slice of a given μop may be defined as a series of μops in the execution window that are to be executed to determine the sources that feed this μop. Note that the criticality detector circuit 260 may only seek information for the dependent slice in the execution window, which his defined by a certain depth, so μops beyond this depth of μops have already been executed and do not lie on the forward-looking critical path.

In various embodiments, the dependent slice may be determined with traversal of the DDG graph. The E node of a critical μop may be sampled for dependencies and a depth-first search may be performed until reaching the head of the execution window (the first μop in the window). Identified critical μops may now be available for optimizations. This dependent slice marking may take a number of cycles equal to the length of the dependent slice. On a misspeculation, the dependent slice marking may be cleared.

Figure 4:
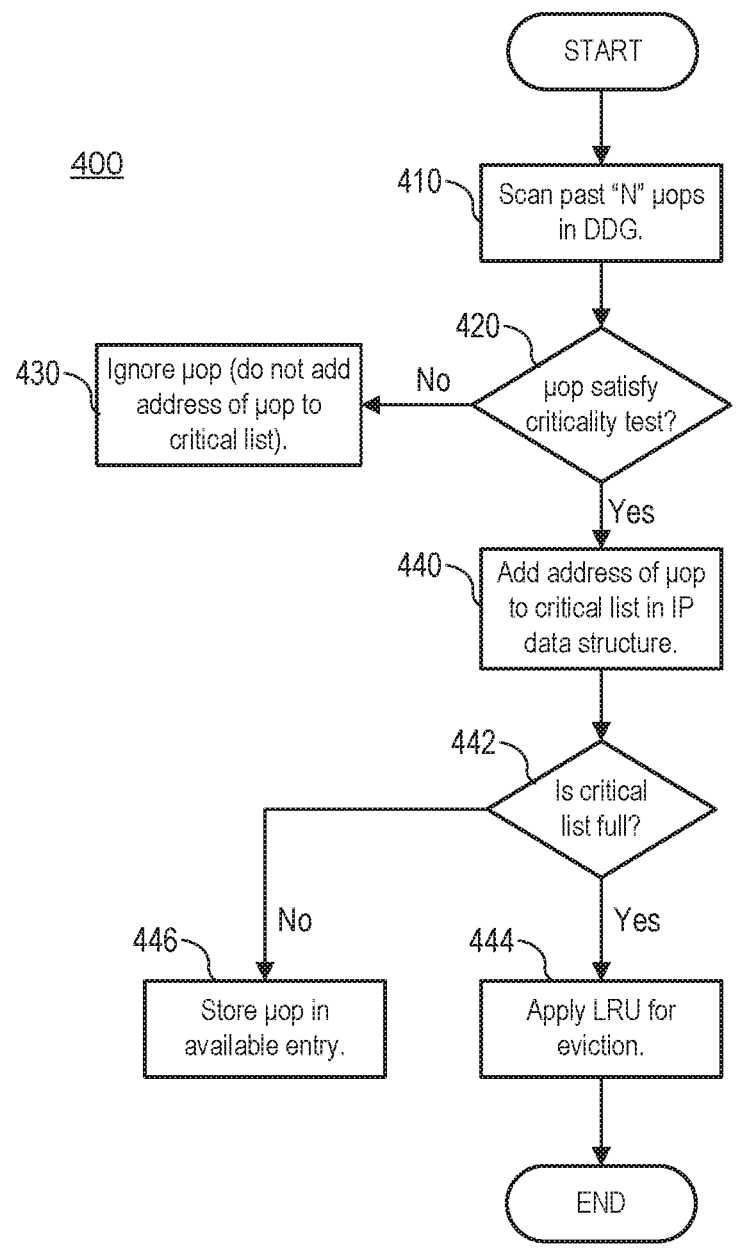
FIG. 4 is flow chart of a method for interacting with the buffer of FIG. 2A in order to update a critical list of micro-operations for the software program, according to an embodiment of the present disclosure.

FIG. 4 is flow chart 400 of a method for interacting with the buffer 220 of FIG. 2A in order to update a critical list of micro-operations for the software program, according to an embodiment of the present disclosure. The method 400 may be performed by a process system that may include hardware (e.g., circuitry, dedicated logic, and/or programmable logic), software (e.g., instructions executable on a computer system to perform hardware simulation), or a combination thereof. In an illustrative example, the method 400 may be performed by the processor 200 of FIG. 2. More particularly, a criticality aware circuit 210 of the processor 200 may perform the method 400. The method 400 and/or each of its functions, routines, subroutines, or operations may be performed by one or more processors of a computing system such as a computing system that shares aspects of the system architecture. Two or more functions, routines, subroutines, or operations of the method 400 may be performed in parallel or in an order which may differ from the order described above.

With reference to FIG. 4, the method may start with the criticality detector circuit 260 scanning past "N" μops in the history portion of the DDG (410). The method 400 may continue with the criticality detector circuit 260 (or the criticality query circuit 264) determining whether a μop satisfied a criticality test or criteria being considered critical (420). This may be performed by analysis of the μops buffered in the DDG that have retired. Additionally, or alternatively, the test may identify μops that, by the nature of their execution, have slowed down the OOO pipeline, such as a load μop that missed the cache and read memory to get data, or a mispredicted branch μop, or if the μop lies on the dependent slice of such a μop. The method 400 may continue with the criticality detector circuit 260 ignoring the μop when it is determined to not be critical (430).

With further reference to FIG. 4, the method 400 may continue with the criticality detector circuit 260 adding the address of the μop to the critical list in an IP data structure in response to determining that the μop does satisfy a criticality test or criteria (440). The method 400 may continue with determining whether the critical list is full (442), for example, whether there is a free entry in an appropriate IP data structure of the memory 218 in which to store the program address of the μop. If the answer is no, the criticality detector circuit 260 may store a reference to the μop in the available entry (446). If the answer is yes, the criticality detector circuit 260 may apply least-recently-used logic to evict the oldest critical μop entry to store a reference to the current μop determined to be critical (444).

Figure 5:
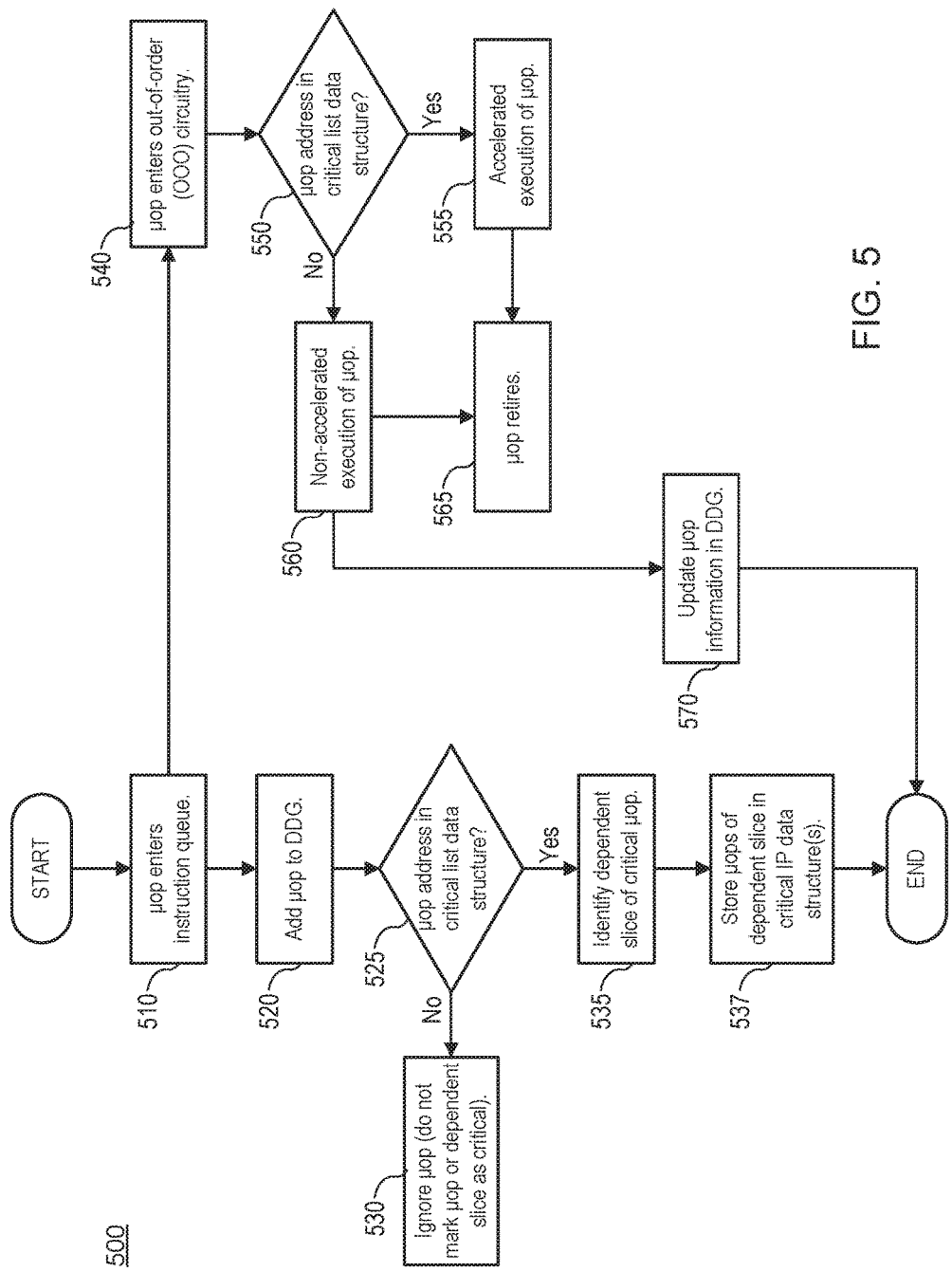
FIG. 5 is a flow chart of a method for updating the DDG and critical list of micro-operations, according to an embodiment of the present disclosure.

FIG. 5 is a flow chart of a method 500 for updating the DDG and critical list of micro-operations, according to an embodiment of the present disclosure. The method 500 may be performed by a process system that may include hardware (e.g., circuitry, dedicated logic, and/or programmable logic), software (e.g., instructions executable on a computer system to perform hardware simulation), or a combination thereof. In an illustrative example, the method 500 may be performed by the processor 200 of FIG. 2. More particularly, a criticality aware circuit 210 of the processor 200 may perform the method 500. The method 500 and/or each of its functions, routines, subroutines, or operations may be performed by one or more processors of a computing system such as a computing system that shares aspects of the system architecture. Two or more functions, routines, subroutines, or operations of the method 500 may be performed in parallel or in an order which may differ from the order described above.

With reference to FIG. 5, the method 500 may start with detecting a μop enter an instruction queue that feeds the OOO pipeline 201 (510). The method 500 may continue with the criticality detector circuit 260 adding the μop to the data dependencies of the DDG stored in the buffer 220 (520). The method 500 may continue with the criticality detector circuit 260 determining whether the address of the μop is listed in a critical IP data structure (525). If the answer is no, the method 500 may continue with the criticality detector circuit 260 ignoring the μop (530). If the answer is yes, the method 500 may continue with the criticality detector circuit 260 identifying a dependent slice of the critical μop (535). To mark the μops as critical, the method 500 may continue with the criticality detector circuit 260 storing the program address (IP) of each μop in one or more of the critical IP data structures (537), or otherwise marking each μop as critical, e.g., by setting a register flag or other operation.

With further reference to FIG. 5, the method 500 may continue with the μop entering OOO circuitry for execution (540). The method 500 may continue with the criticality query circuit 264 determining whether an address of the μop is in a critical list of a critical IP data structure (550). If the answer is yes, the method 500 may continue with the accelerator 214 accelerating execution of the μop as previously discussed (555). The method 500 may continue with the OOO pipeline retiring the μop (565). If the answer is no, the method 500 may continue with non-accelerated execution of the μop (560). The method 500 may continue with the criticality detector circuit updating the μop's information in the DDG (570). The μop's information that may be updated may include whether or not the μop belongs to the above-mentioned instances of critical load misses, critical branches, and critical long-latency arithmetic operations. In one example, the update is by way of setting a bit flag. The method 500 may continue with the OOO pipeline retiring the μop (565).

The criticality aware circuit 210 may employ learning actions taken of the data dependencies of the DDG in the form of performance monitors to signify which instructions have a corresponding μop on the critical path. This interface can be exposed through vTunes™ or a Performance Monitoring Unit (PMU) for an accurate identification of the hot spots in the program. Useful statistics about how many times the corresponding instruction was critical, and the like, may be exposed for accurate profiling. This will help accurately identify the load misses, branch mispredictions, and long dependency arithmetic instructions that truly affect the performance of the software.

Figure 6:
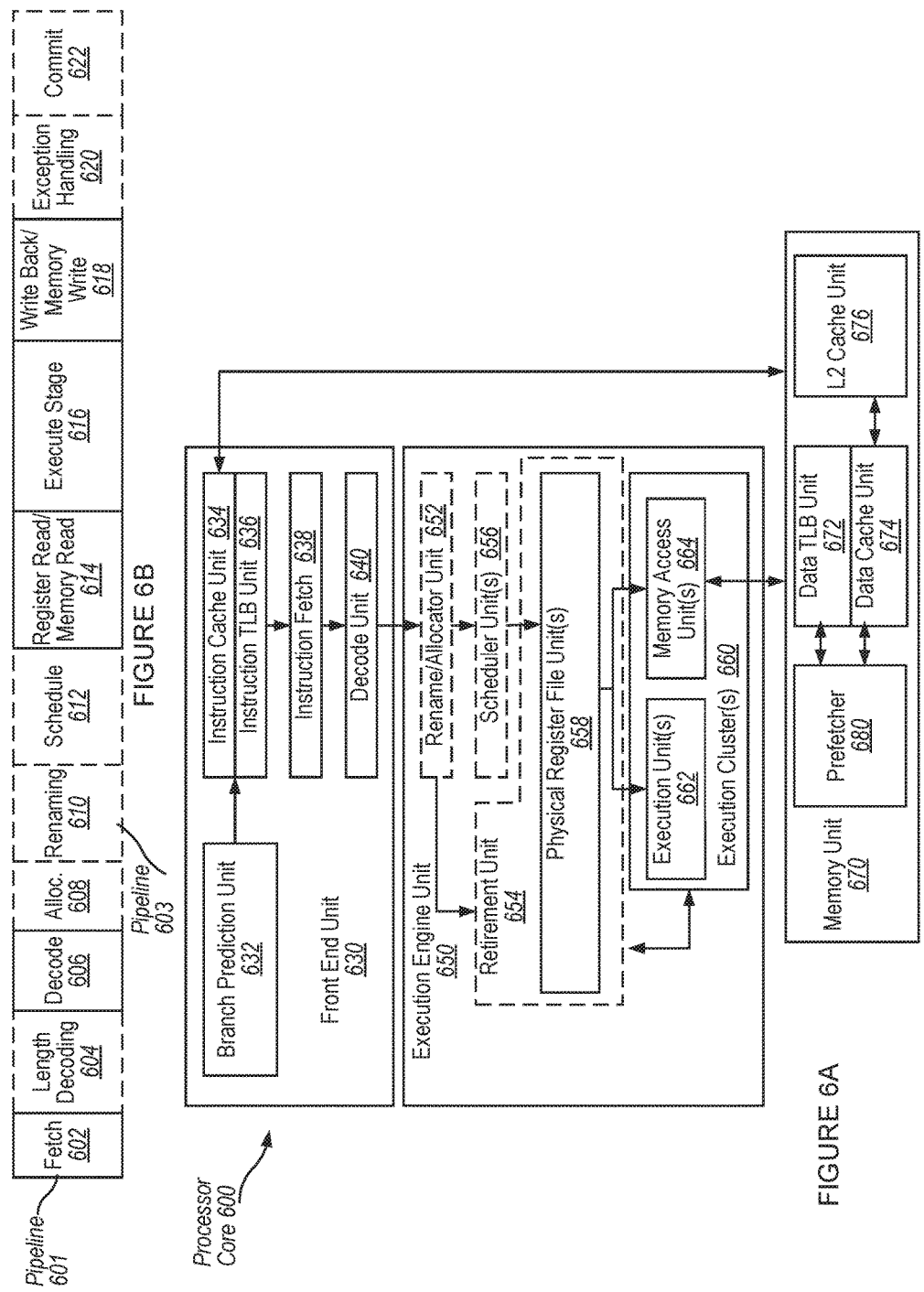
FIG. 6A is a block diagram illustrating an in-order pipeline and a register renaming stage, out-of-order issue/execution pipeline according to one embodiment.
FIG. 6B is a block diagram illustrating a micro-architecture for a processor or an integrated circuit for performing hardware-based extraction of program instructions for critical paths, according to an embodiment of the present disclosure.

FIG. 6A is a block diagram illustrating a micro-architecture for a processor 600 to perform operations of a processor or an integrated circuit for performing hardware-based extraction of program instructions for critical paths, according to an embodiment. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different scheduler circuits, including reservations stations (RS), central instruction window, etc. The scheduler unit(s) 656 is coupled to the physical register set units 658. Each of the physical register set units 658 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set units 658 is overlapped by the retirement unit 654 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register set units 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register set units 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline 601, while the dashed lined boxes illustrate a register renaming, out-of-order issue/execution pipeline 603. In FIG. 6B, the pipelines 601 and 603 include a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 620, and a commit stage 622. In some embodiments, the ordering of stages 602-622 may be different than illustrated and are not limited to the specific ordering shown in FIG. 6B.

Figure 7:
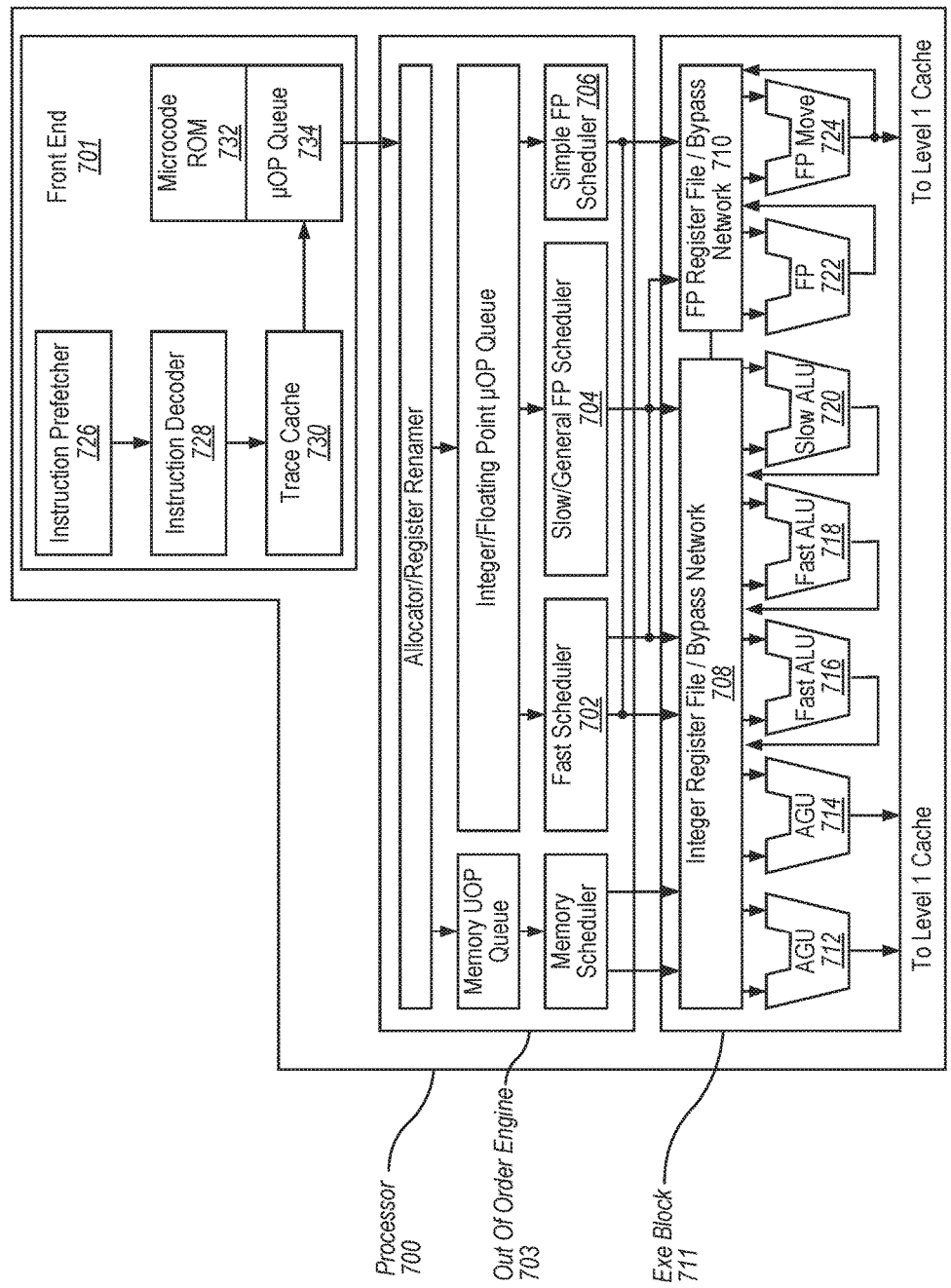
FIG. 7 illustrates a block diagram of the micro-architecture for a processor or an integrated circuit for performing hardware-based extraction of program instructions for critical paths, according to an embodiment of the present disclosure.

FIG. 7 illustrates a block diagram of the micro-architecture for a processor 700 that includes logic circuits of a processor or an integrated circuit for performing hardware-based extraction of program instructions for critical paths, according to an embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the page additions and content copying can be implemented in processor 700.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, microcode ROM (or RAM) 732 provides the uops needed to complete the operation.

Some instructions are converted into a single micro-op, whereas others need several micro-ops to complete the full operation. In one embodiment, if more than four micro-ops are needed to complete an instruction, the instruction decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register sets 708, 710, sit between the schedulers 702, 704, 706, and the execution units 712, 714, 716, 718, 720, 722, 724 in the execution block 711. There is a separate register set 708, 710, for integer and floating point operations, respectively. Each register set 708, 710, of one embodiment also includes a bypass network that can bypass or forward just completed results that have not yet been written into the register set to new dependent uops. The integer register set 708 and the floating point register set 710 are also capable of communicating data with the other. For one embodiment, the integer register set 708 is split into two separate register sets, one register set for the low order 32 bits of data and a second register set for the high order 32 bits of data. The floating point register set 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register sets 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 722, 724. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register set of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register set or different register sets. Furthermore, in one embodiment, floating point and integer data may be stored in different registers or the same registers.

Figure 8:
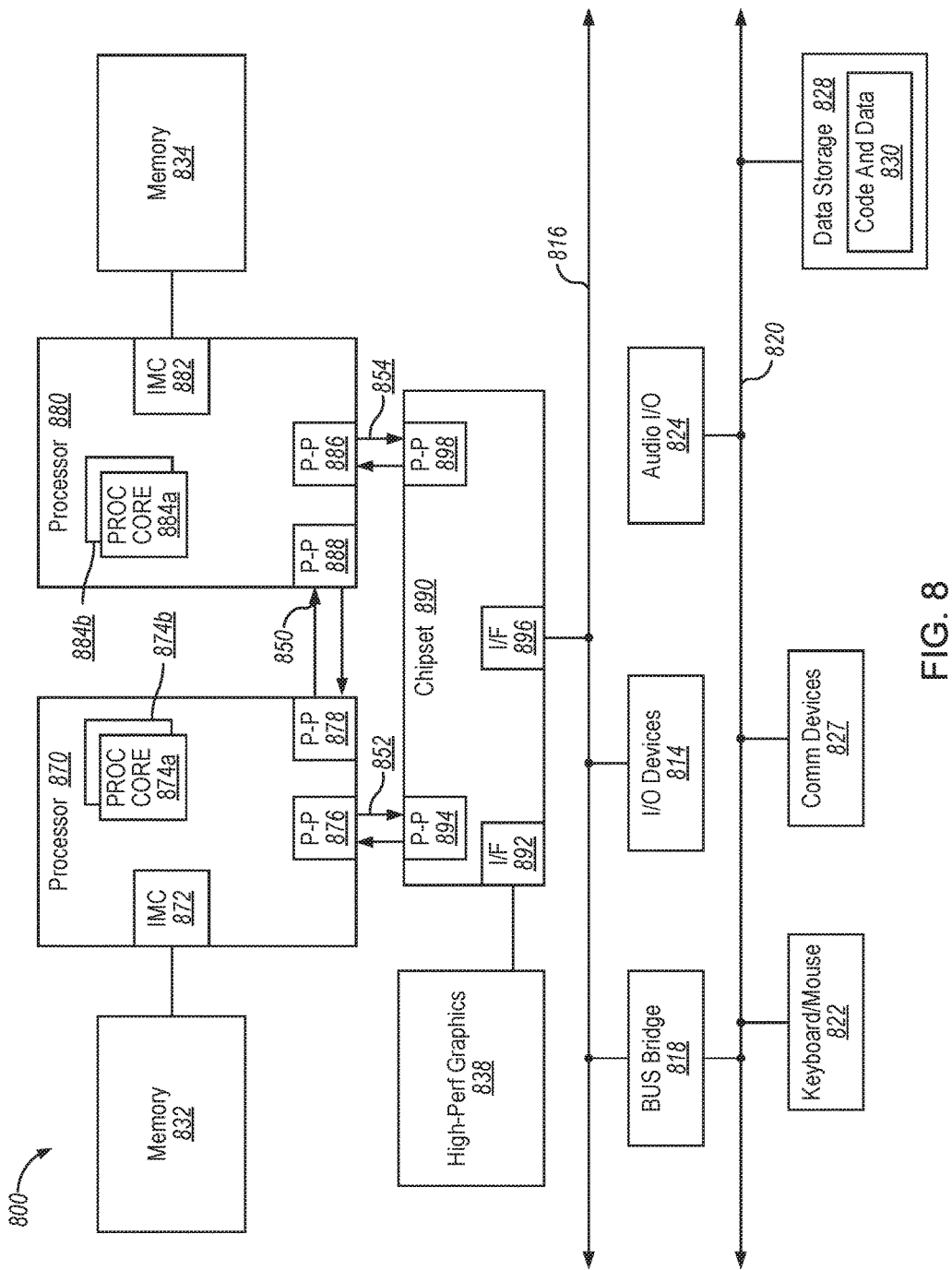
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. While shown with two processors 870, 880, it is to be understood that the scope of the present disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 892.

Chipset 890 may be coupled to a first bus 816 via an interface 896. In one embodiment, first bus 816 may be a Peripheral Component Interconnect (PCI) bus, or a bus such as a PCI Express bus or interconnect bus, although the scope of the present disclosure is not so limited.

As shown in FIG. 8, various I/O devices 814 may be coupled to first bus 816, along with a bus bridge 818 which couples first bus 816 to a second bus 820. Various devices may be coupled to second bus 820 including, for example, a keyboard and/or mouse 822, communication devices 827 and a storage unit 828 which may include instructions/code and data 830, in one embodiment. Further, an audio I/O 824 may be coupled to second bus 820.

Figure 9:
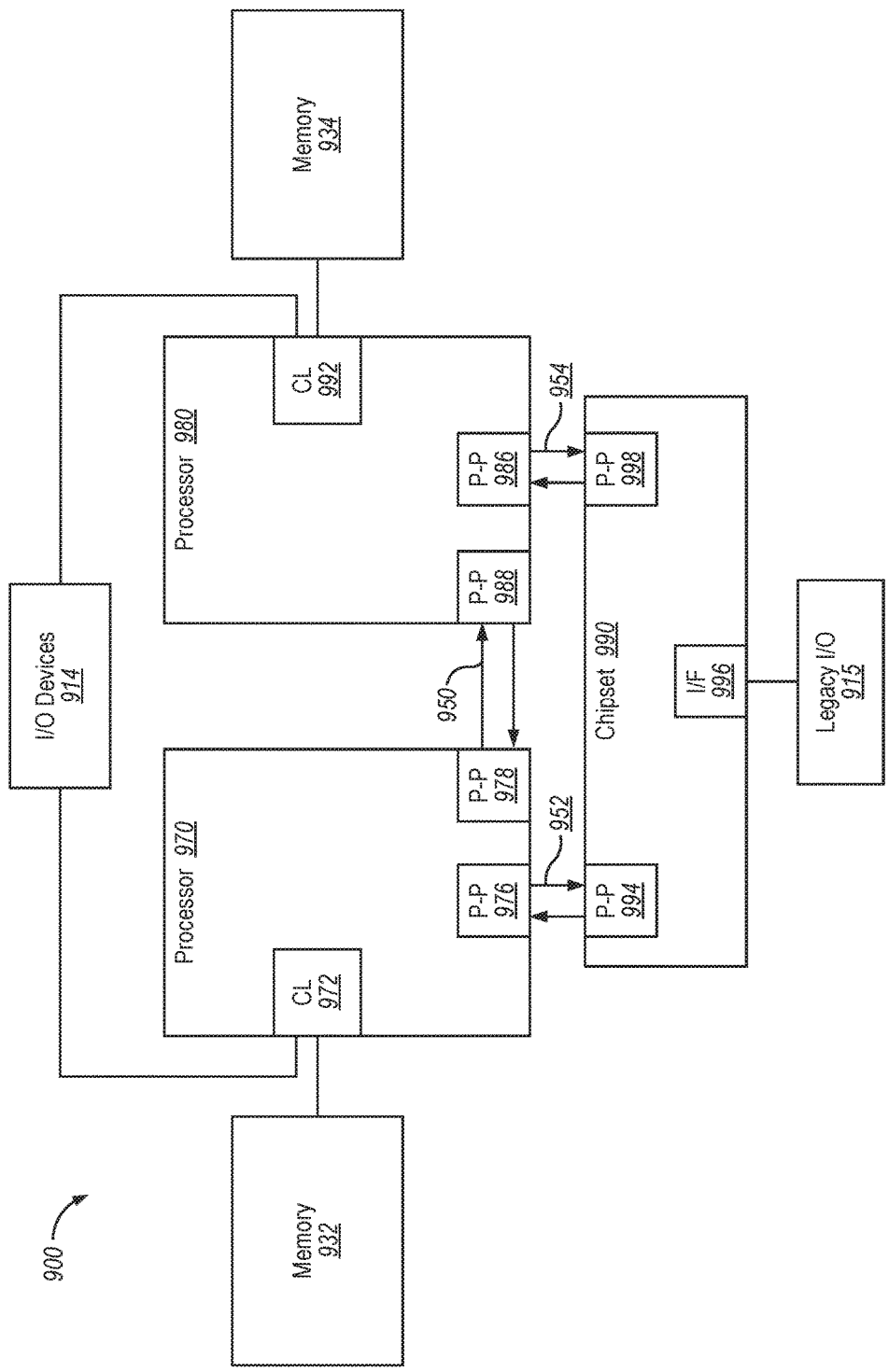
FIG. 9 is a block diagram of a computer system according to another implementation.

Referring now to FIG. 9, shown is a block diagram of a third system 900 in accordance with an embodiment of the present disclosure. Like elements in FIGS. 8 and 9 bear like reference numerals and certain aspects of FIG. 9 have been omitted from FIG. 8 in order to avoid obscuring other aspects of FIG. 9.

FIG. 9 illustrates processors 970, 980. In one embodiment, processors 970, 980 may include integrated memory and I/O control logic ("CL") 972 and 992, respectively, and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units such as described herein. In addition, CL 972, 992 may also include I/O control logic. FIG. 9 illustrates that the memories 932, 934 are coupled to the CL 972, 992, and that I/O devices 914 are also coupled to the control logic 972, 992. Legacy I/O devices 915 are coupled to the chipset 990 via interface 996.

Figure 10:
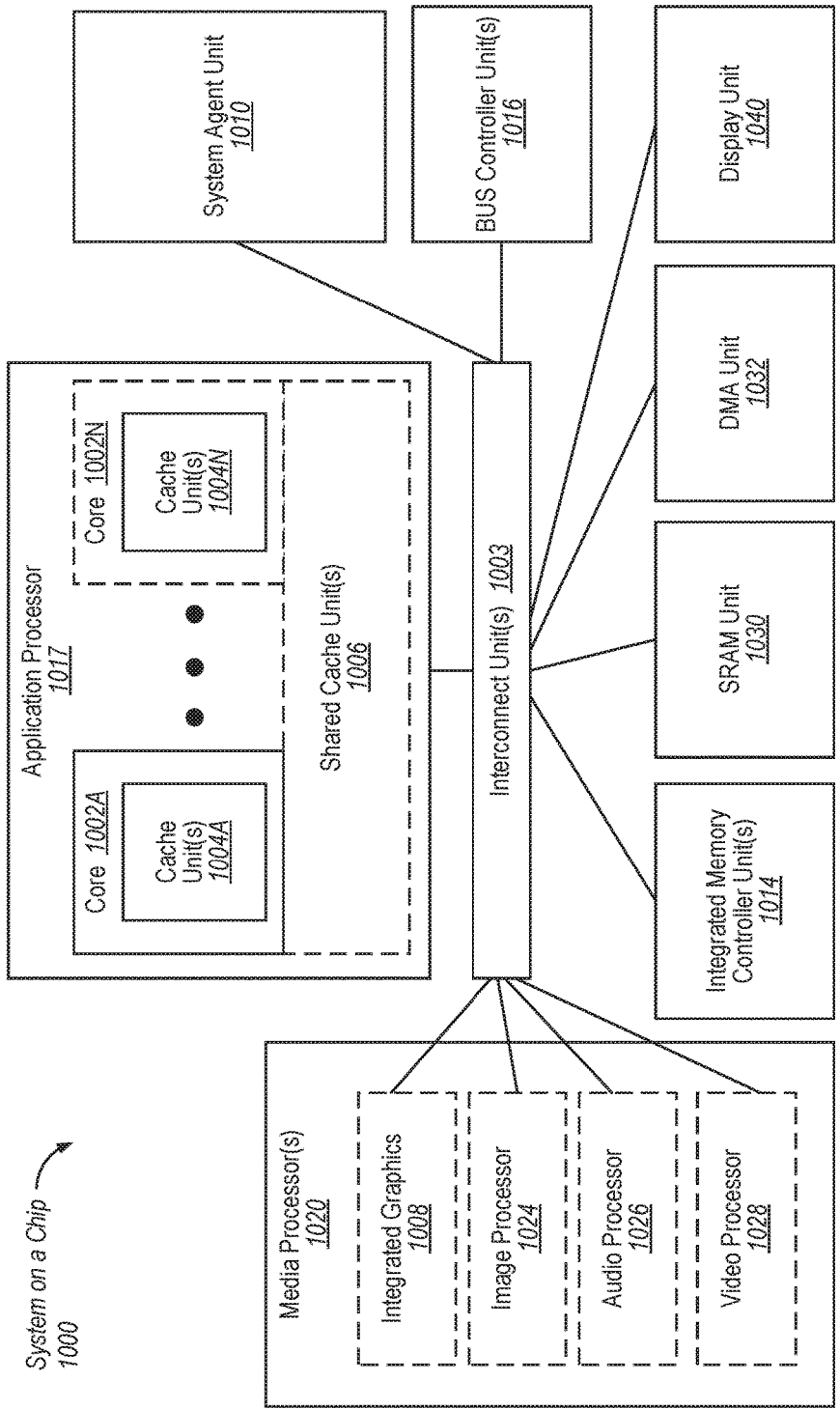
FIG. 10 is a block diagram of a system-on-a-chip according to one implementation.

FIG. 10 is an exemplary system on a chip (SoC) 1000 that may include one or more of the cores 1002A . . . 1002N. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1000 of FIG. 10, dashed lined boxes are features on more advanced SoCs. An interconnect unit(s) 1003 may be coupled to: an application processor 1017 which includes a set of one or more cores 1002A-N, containing one or more cache unit(s) 1004A . . . 1004N, respectively, and shared cache unit(s) 1006; a system agent unit 1010; a bus controller unit(s) 1016; an integrated memory controller unit(s) 1014; a set of one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
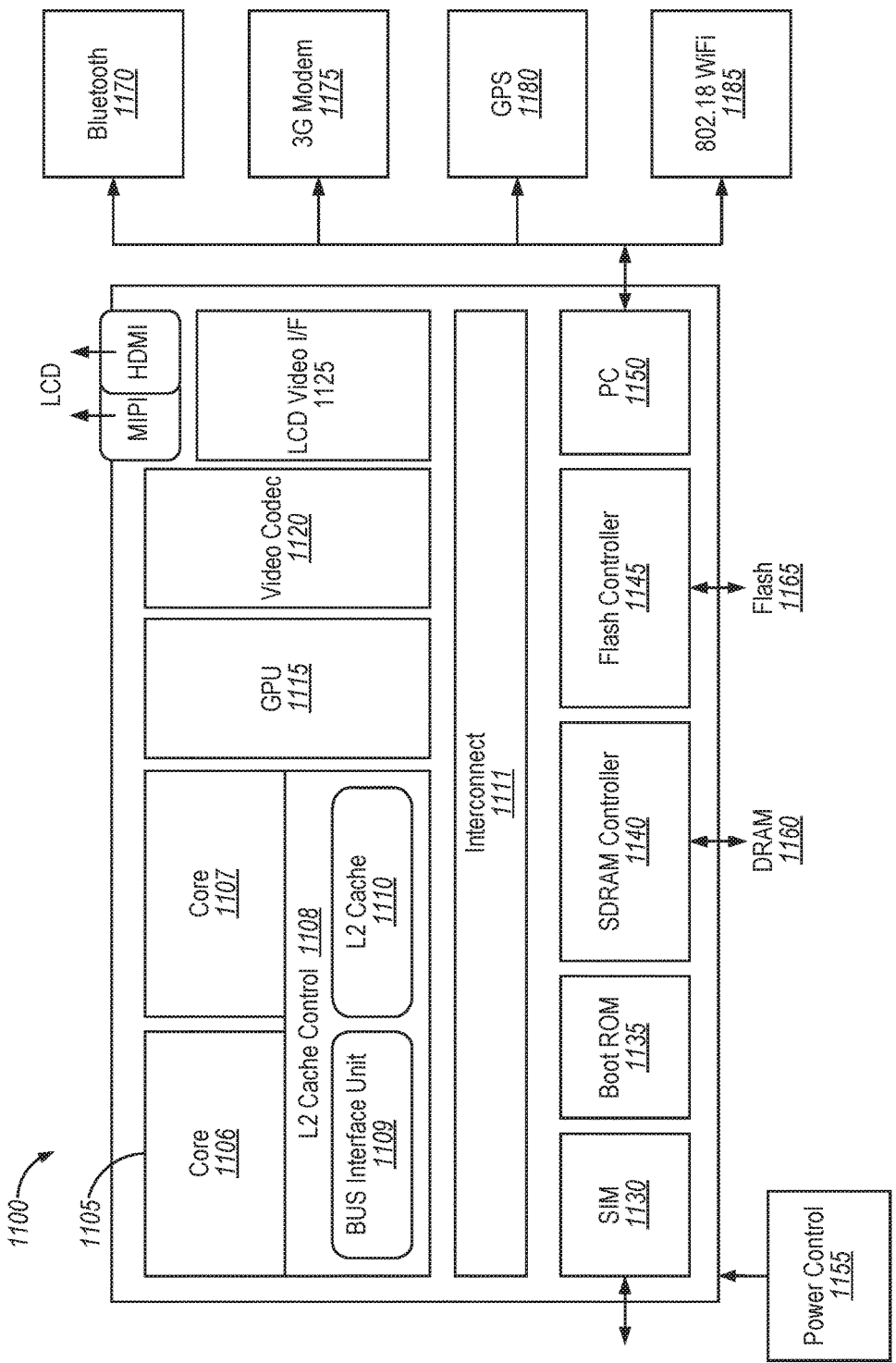
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

In one embodiment, SDRAM controller 1140 may connect to interconnect 1111 via cache 1110. Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a power control module 1155, a Bluetooth® module 1170, 3G modem 1175, GPS 1180, and Wi-Fi® 1185. Note as stated above, a UE includes a radio for communication. As a result, these peripheral communication modules may not all be included. However, in a UE some form of a radio for external communication should be included.

Figure 12:
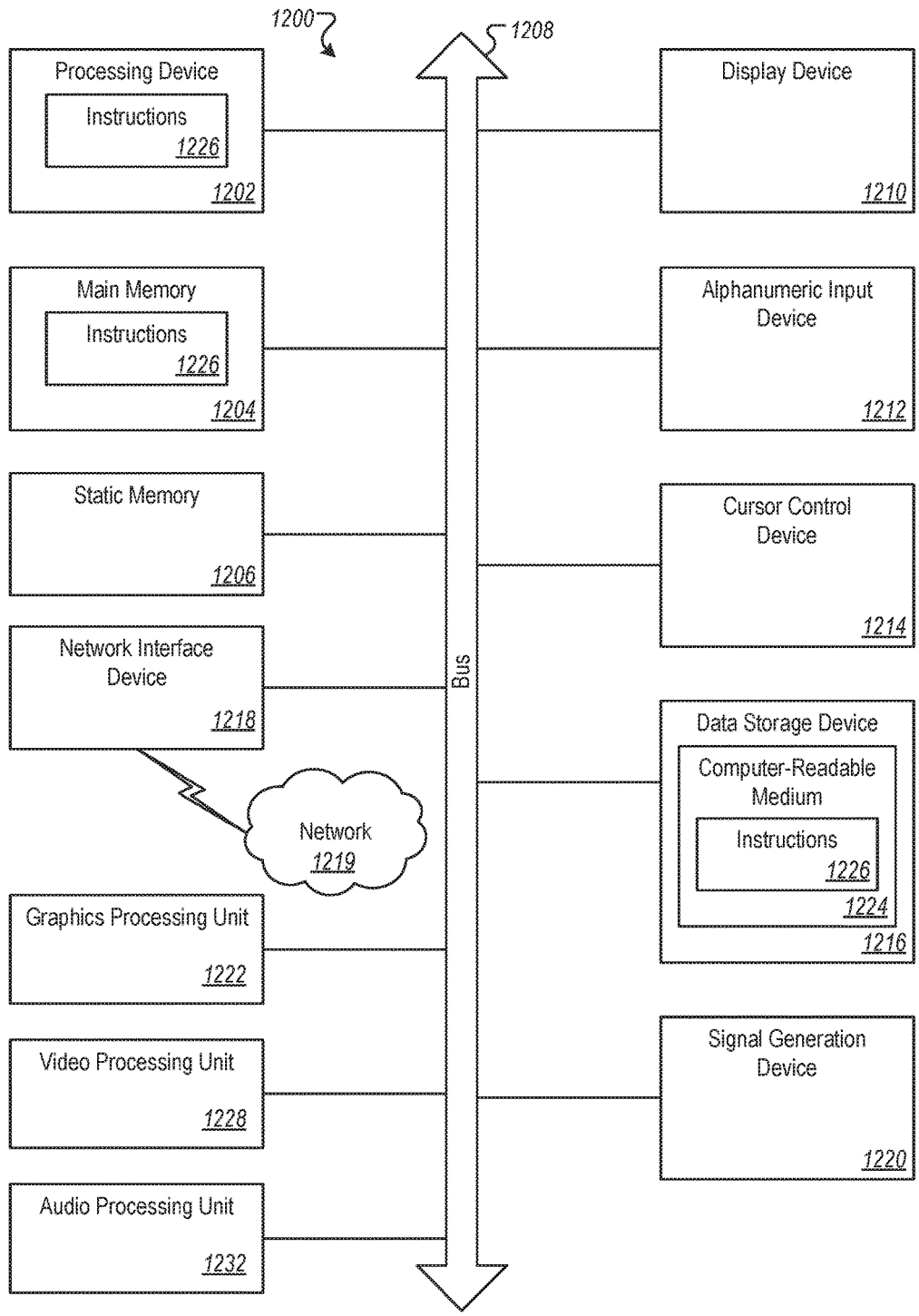
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1200.

The computing system 1200 includes a processing device 1202, main memory 1204 (e.g., flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1216, which communicate with each other via a bus 1208.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application-specific integrated circuit (ASIC), a field programmable gate array (FPGA), a digital signal processor (DSP), network processor, or the like. In one embodiment, processing device 1202 may include one or more processor cores. The processing device 1202 is configured to execute the processing logic 1226 for performing the operations discussed herein.

In one embodiment, processing device 1202 can be part of a processor or an integrated circuit that includes the disclosed LLC caching architecture. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1218 communicably coupled to a network 1219. The computing system 1200 also may include a video display device 1210 (e.g., a liquid crystal display (LCD) or a cathode ray tube (CRT)), an alphanumeric input device 1212 (e.g., a keyboard), a cursor control device 1214 (e.g., a mouse), a signal generation device 1220 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1216 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic during execution thereof by the computing system 1200; the main memory 1204 and the processing device 1202 also constituting computer-readable storage media.

The computer-readable storage medium 1224 may also be used to store instructions 1226 utilizing the processing device 1202, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is processor comprising: 1) an out-of-order (OOO) pipeline; 2) a memory coupled to the OOO pipeline, the memory to hold a buffer to store data dependencies for each of a plurality of micro-operations allocated in the OOO pipeline, wherein the data dependencies are represented in data as nodes and edges, the nodes comprising a first node for a dispatch stage, a second node for an execution stage, and a third node for a commit stage; and 3) a criticality detector circuit coupled to the memory, the criticality detector circuit to: a) queue, in the buffer, the nodes of a micro-operation of the plurality of micro-operations; b) add, to determine a node weight for each node of the nodes of the micro-operation, an edge weight to a previous node weight of a connected micro-operation that yields a maximum node weight for the node, wherein the node weight comprises a number of execution cycles of the OOO pipeline and the edge weight comprises a number of execution cycles to execute the connected micro-operation; and c) identify, as a critical path, a path through the data dependencies that yields the maximum node weight for the third node of the micro-operation.

In Example 2, the processor of Example 1, wherein the buffer is divided into three sections comprising micro-operations being allocated in the OOO pipeline, micro-operations being executed with OOO circuitry of the OOO pipeline, and a history of most-recently retired micro-operations, and wherein the history is used to identify the critical path.

In Example 3, the processor of Example 1, wherein, to queue the micro-operation, the criticality detector circuit is further to store the node weights of the nodes with an edge index value, the edge index value indicating which edge to follow to the connected micro-operation to produce the maximum node weight.

In Example 4, the processor of Example 3, wherein to identify the critical path through the data dependencies, the criticality detector circuit is to start at the third node for the micro-operation, and trace the critical path along edge index values of respective nodes of the plurality of micro-operations back to a first node of a first micro-operation of the data dependencies in the buffer.

In Example 5, the processor of Example 1, wherein the criticality detector circuit is further to store the node weight using bits employed to store edges between second nodes of the micro-operations of the plurality of micro-operations.

In Example 6, the processor of Example 5, wherein when the node weight reaches saturation in view of a number of the bits that represent the node weight, the criticality detector circuit is further to halve the node weights for nodes of the plurality of micro-operations.

In Example 7, the processor of Example 1, wherein the criticality detector circuit is further to store, in a critical instruction pointer (IP) data structure, an address of each micro-operation of the plurality of micro-operations having a second node lying along the critical path.

In Example 8, the processor of Example 1, wherein the criticality detector circuit is to identify the critical path through the data dependencies once every predetermined number of micro-operations that defines a size of a history portion of the buffer.

Various embodiments may have different combinations of the structural features described above. For instance, all optional features of the processors and methods described above may also be implemented with respect to a system described herein and specifics in the examples may be used anywhere in one or more embodiments.

Example 9 is a system on a chip (SoC) comprising: 1) an out-of-order (OOO) pipeline; 2) a memory coupled to the OOO pipeline, the memory to store: a) a critical instruction pointer (IP) data structure; and b) a buffer to store data dependencies for each of a plurality of micro-operations allocated in the OOO pipeline, wherein the data dependencies are represented in data as nodes and edges, the nodes comprising a first node for a dispatch stage, a second node for an execution stage, and a third node for a commit stage; and c) a criticality detector circuit coupled to the memory and to the OOO pipeline, the criticality detector circuit to: i) queue, in the buffer, the nodes of a micro-operation of the plurality of micro-operations; ii) add, to determine a node weight for each node of the nodes of the micro-operation, an edge weight to a previous node weight of a connected micro-operation that yields a maximum node weight for the node, wherein the node weight comprises a number of execution cycles of the OOO pipeline and the edge weight comprises a number of execution cycles to execute the connected micro-operation; iii) identify, as a critical path, a path through the data dependencies of the plurality of micro-operations that yields the maximum node weight for the third node of the micro-operation; iv) identify, in the data dependencies, one or more second micro-operations on which a critical micro-operation depends, the critical micro-operation being of a certain type and located along the critical path of the data dependencies; and v) store an address of the one or more second micro-operations in the critical IP data structure.

In Example 10, the SoC of Example 9, wherein the criticality detector circuit is further to: a) detect that the micro-operation is to commit; b) determine that the connected micro-operation is on the critical path and has an edge between second nodes of the micro-operation and the connected micro-operation; and c) remove, from the IP data structure as being non-critical, any third micro-operation having a second node located in the data dependencies between the micro-operation and the connected micro-operation.

In Example 11, the SoC of Example 9, wherein the critical micro-operation of the certain type comprises one of a critical load miss, a critical branch, or a critical long-latency arithmetic operation.

In Example 12, the SoC of Example 9, wherein the critical micro-operation is a load operation and, to identify the one or more second micro-operations, the criticality detector circuit is further to access an IP pairs data structure to identify a store micro-operation on which the load operation depends.

In Example 13, the SoC of Example 9, wherein, to identify the one or more second micro-operations, the criticality detector circuit is further to access a critical branch IP data structure in which is stored addresses of micro-operations, including branches, which have been determined to be critical in the past or due to machine learning performed on the data dependencies.

In Example 14, the SoC of Example 9, wherein, to queue the micro-operation, the criticality detector circuit is further to store the node weights of the nodes with an edge index value, the edge index value indicating which edge to follow to the connected micro-operation to produce the maximum node weight.

In Example 15, the SoC of Example 14, wherein to identify the critical path through the data dependencies, the criticality detector circuit is to start at the third node for the micro-operation, and trace the critical path along edge index values of respective nodes of the plurality of micro-operations back to a first node of a first micro-operation of the data dependencies in the buffer.

In Example 16, the SoC of Example 9, wherein the criticality detector circuit is further to store the node weight using bits employed to store edges between second nodes of micro-operations of the plurality of micro-operations.

Various embodiments may have different combinations of the structural features described above. For instance, all optional features of the processors and methods described above may also be implemented with respect to a system described herein and specifics in the examples may be used anywhere in one or more embodiments.

Example 17 is a method comprising: 1) inserting, by a processor, a micro-operation in an instruction queue for allocation in an out-of-order (OOO) pipeline of the processor; 2) adding, by a criticality detector circuit of the processor, the micro-operation to data dependencies stored in a buffer, wherein the data dependencies are represented in data as nodes and edges of each of a plurality of micro-operations of the program, the nodes comprising a first node for a dispatch stage, a second node for an execution stage, and a third node for a commit stage; 3) adding, by the criticality detector circuit and to determine a node weight for each node of the nodes of the micro-operation, an edge weight to a previous node weight of a connected micro-operation that yields a maximum node weight for the node, wherein the node weight comprises a number of execution cycles of the OOO pipeline and the edge weight comprises a number of execution cycles to execute the connected micro-operation; and 4) identifying, as a critical path by the criticality detector circuit, a path through the data dependencies of the plurality of micro-operations that yields the maximum node weight for the third node of the micro-operation.

In Example 18, the method of claim 17, further comprising: 1) detecting, by the processor, the micro-operation enter the OOO pipeline; 2) determining, by the processor, that reference to the micro-operation is stored in a data structure that lists critical micro-operations; and 3) accelerating, by the processor, execution of the micro-operation in response to the reference to the micro-operation being located in the data structure.

In Example 19, the method of claim 17, further comprising: 1) determining, by the criticality detector circuit, that the micro-operation is stored in a data structure that lists critical micro-operations; 2) identifying, in the data dependencies, one or more second micro-operations on which a critical micro-operations depends, the critical micro-operation being of a certain type and located along the critical path of the data dependencies; and 3) storing an address of the one or more second micro-operations in the data structure.

In Example 20, the method of claim 17, wherein adding the micro-operation to the data dependencies further comprises storing the node weights of the nodes with an edge index value, the edge index value indicating which edge to follow to the connected micro-operation to produce the maximum node weight.

In Example 21, the method of claim 20, wherein identifying the critical path through the data dependencies comprises: 1) starting at the third node for the micro-operation; and 2) tracing the critical path along edge index values of respective nodes of the plurality of micro-operations back to a first node of a first micro-operation of the data dependencies.

In Example 22, the method of claim 17, further comprising: 1) detecting, by the processor, a second micro-operation enter the OOO pipeline, the second micro-operation following the micro-operation in program order of the program; 2) determining, by the criticality detector circuit, that a reference to the second micro-operation is not stored in a data structure that lists critical micro-operations; and 3) after non-accelerated execution of the second micro-operation with the OOO pipeline, setting a bit flag within the data dependencies to indicate that the second micro-operation is not critical.

In Example 23, the method of claim 17, further comprising storing, in a critical instruction pointer (IP) data structure, an address of each micro-operation of the plurality of micro-operations having a second node lying along the critical path.

In Example 24, the method of claim 17, wherein identifying the critical path through the data dependencies is performed by the criticality detector circuit once every predetermined number of retired micro-operations that defines a size of a history portion of the buffer.

Various embodiments may have different combinations of the structural features described above. For instance, all optional features of the processors and methods described above may also be implemented with respect to a system described herein and specifics in the examples may be used anywhere in one or more embodiments.

Example 25 comprises a processor comprising: 1) means for inserting a micro-operation in an instruction queue for allocation in an out-of-order (OOO) pipeline of a processor; 2) means for adding the micro-operation to data dependencies stored in a buffer, wherein the data dependencies are represented in data as nodes and edges of each of a plurality of micro-operations of a program, the nodes comprising a first node for a dispatch stage, a second node for an execution stage, and a third node for a commit stage; 3) means for adding, to determine a node weight for each node of the nodes of the micro-operation, an edge weight to a previous node weight of a connected micro-operation that yields a maximum node weight for the node, wherein the node weight comprises a number of execution cycles of the OOO pipeline and the edge weight comprises a number of execution cycles to execute the connected micro-operation; and 4) means for identifying, as a critical path, a path through the data dependencies of the plurality of micro-operations that yields the maximum node weight for the third node of the micro-operation.

In Example 26, the processor of Example 25, further comprising: 1) means for detecting the micro-operation enter the OOO pipeline; 2) means for determining that reference to the micro-operation is stored in a data structure that lists critical micro-operations; and 3) means for accelerating execution of the micro-operation in response to the reference to the micro-operation being located in the data structure.

In Example 27, the method of any of Examples 25-26, further comprising: 1) means for determining that the micro-operation is stored in a data structure that lists critical micro-operations; 2) means for identifying, in the data dependencies, one or more second micro-operations on which a critical micro-operations depends, the critical micro-operation being of a certain type and located along the critical path of the data dependencies; and 3) means for storing an address of the one or more second micro-operations in the data structure.

In Example 28, the processor of any of Examples 25-27, wherein the means for adding the micro-operation to the data dependencies further comprises means for storing the node weights of the nodes with an edge index value, the edge index value indicating which edge to follow to the connected micro-operation to produce the maximum node weight.

In Example 29, the processor of Example 28, wherein the means for identifying the critical path through the data dependencies comprises: 1) means for starting at the third node for the micro-operation; and 2) means for tracing the critical path along edge index values of respective nodes of the plurality of micro-operations back to a first node of a first micro-operation of the data dependencies.

In Example 30, the processor of any of Examples 25-29, further comprising: 1) means for detecting a second micro-operation enter the OOO pipeline, the second micro-operation following the micro-operation in program order of the program; 2) means for determining that a reference to the second micro-operation is not stored in a data structure that lists critical micro-operations; and 3) after non-accelerated execution of the second micro-operation with the OOO pipeline, means for setting a bit flag within the data dependencies to indicate that the second micro-operation is not critical.

In Example 31, the processor of any of Examples 25-30, further comprising means for storing, in a critical instruction pointer (IP) data structure, an address of each micro-operation of the plurality of micro-operations having a second node lying along the critical path.

In Example 32, the processor of any of Examples 25-31, wherein the means for identifying the critical path through the data dependencies identifies the critical path once every predetermined number of retired micro-operations that defines a size of a history portion of the buffer.

Various embodiments may have different combinations of the structural features described above. For instance, all optional features of the processors and methods described above may also be implemented with respect to a system described herein and specifics in the examples may be used anywhere in one or more embodiments.

Example 33 comprises a non-transitory computer-readable storage medium for storing instructions, which when decoded for execution by an out-of-order (OOO) processor, cause the OOO processor to: 1) insert a micro-operation in an instruction queue for allocation in an OOO pipeline of the OOO processor; 2) add the micro-operation to data dependencies stored in a buffer, wherein the data dependencies are represented in data as nodes and edges of each of a plurality of micro-operations of a program, the nodes comprising a first node for a dispatch stage, a second node for an execution stage, and a third node for a commit stage; 3) add, to determine a node weight for each node of the nodes of the micro-operation, an edge weight to a previous node weight of a connected micro-operation that yields a maximum node weight for the node, wherein the node weight comprises a number of execution cycles of the OOO pipeline and the edge weight comprises a number of execution cycles to execute the connected micro-operation; and 4) identify, as a critical path by the criticality detector circuit, a path through the data dependencies of the plurality of micro-operations that yields the maximum node weight for the third node of the micro-operation.

In Example 34, the non-transitory computer-readable storage medium of Example 33, wherein the instructions, when decoded, are further to cause the OOO processor to: 1) detect the micro-operation enter the OOO pipeline; 2) determine that reference to the micro-operation is stored in a data structure that lists critical micro-operations; and 3) accelerate execution of the micro-operation in response to the reference to the micro-operation being located in the data structure.

In Example 35, the non-transitory computer-readable storage medium of any of Examples 33-34, wherein the instructions, when decoded, are further to cause the OOO processor to: 1) determine that the micro-operation is stored in a data structure that lists critical micro-operations; 2) identify, in the data dependencies, one or more second micro-operations on which a critical micro-operations depends, the critical micro-operation being of a certain type and located along the critical path of the data dependencies; and 3) store an address of the one or more second micro-operations in the data structure.

In Example 36, the non-transitory computer-readable storage medium of any of Examples 33-35, wherein to add the micro-operation to the data dependencies further comprises to store the node weights of the nodes with an edge index value, the edge index value indicating which edge to follow to the connected micro-operation to produce the maximum node weight.

In Example 37, the non-transitory computer-readable storage medium of any of Example 33-36, wherein to identify the critical path through the data dependencies comprises to: 1) start at the third node for the micro-operation; and 2) trace the critical path along edge index values of respective nodes of the plurality of micro-operations back to a first node of a first micro-operation of the data dependencies.

In Example 38, the non-transitory computer-readable storage medium of any of Examples 33-37, wherein the instructions, when decoded, are further to cause the OOO processor to: 1) detect a second micro-operation enter the OOO pipeline, the second micro-operation following the micro-operation in program order of the program; 2) determine that a reference to the second micro-operation is not stored in a data structure that lists critical micro-operations; and 3) after non-accelerated execution of the second micro-operation with the OOO pipeline, set a bit flag within the data dependencies to indicate that the second micro-operation is not critical.

In Example 39, the non-transitory computer-readable storage medium of any of Examples 33-38, wherein the instructions, when decoded, are further to cause the OOO processor to store, in a critical instruction pointer (IP) data structure, an address of each micro-operation of the plurality of micro-operations having a second node lying along the critical path.

In Example 40, the non-transitory computer-readable storage medium of any of Examples 33-39, wherein to identify the critical path through the data dependencies is performed once every predetermined number of retired micro-operations that defines a size of a history portion of the buffer.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   an out-of-order (OOO) pipeline;
   a memory coupled to the OOO pipeline, the memory to hold a buffer to store data dependencies for each of a plurality of micro-operations allocated in the OOO pipeline, wherein the data dependencies are represented in data as nodes and edges that connect the nodes, wherein the nodes comprise a first node for a dispatch stage, a second node for an execution stage, and a third node for a commit stage; and
   a criticality detector circuit coupled to the memory, the criticality detector circuit to:
   queue, in the buffer, nodes of a selected micro-operation of the plurality of micro-operations;
   add, to determine a node weight for each node of the nodes of the selected micro-operation, an edge weight to a previous node weight of a connected micro-operation of the plurality of micro-operations that shares an edge with the selected micro-operation and yields a maximum value for the node weight of each node, wherein the node weight of each node comprises a number of execution cycles of the OOO pipeline that are cumulatively summed along nodes and edges from an oldest micro-operation of the plurality of micro-operations, and the edge weight associated with each node comprises a maximum number of execution cycles to execute the connected micro-operation; and
   once every predetermined number of micro-operations that defines a size of a history portion of the buffer, identify, as a critical path, a path through the data dependencies that yields the maximum value for the node weight of the third node of the selected micro-operation.

2. The processor of claim 1, wherein the buffer is divided into three sections comprising micro-operations being allocated in the OOO pipeline, micro-operations being executed with OOO circuitry of the OOO pipeline, and a history of most-recently retired micro-operations, and wherein the history is used to identify the critical path.

3. The processor of claim 1, wherein, to queue nodes of the selected micro-operation, the criticality detector circuit is further to store the node weight of each node of the selected micro-operation with an edge index value, the edge index value indicating which edge to follow to the connected micro-operation to produce the maximum value for the node weight of each node.

4. The processor of claim 3, wherein to identify the critical path through the data dependencies, the criticality detector circuit is to start at the third node for the selected micro-operation, and trace the critical path along edge index values of respective nodes of the plurality of micro-operations back to a first node of the oldest micro-operation represented within the data dependencies in the buffer.

5. The processor of claim 1, wherein the criticality detector circuit is further to store the node weight of each node using bits also employed to store values for the edges between second nodes of the plurality of micro-operations.

6. The processor of claim 5, wherein when the node weight for a particular node reaches saturation in view of a number of the bits also used to store values of the edges for the particular node, the criticality detector circuit is further to halve the node weights for nodes of the plurality of micro-operations.

7. The processor of claim 1, wherein the criticality detector circuit is further to store, in a critical instruction pointer (IP) data structure, an address of each micro-operation of the plurality of micro-operations having a second node lying along the critical path.

8. A system on a chip (SoC) comprising:
an out-of-order (OOO) pipeline;
a memory coupled to the OOO pipeline, the memory to store:
  a critical instruction pointer (IP) data structure; and
  a buffer to store data dependencies for each of a plurality of micro-operations allocated in the OOO pipeline, wherein the data dependencies are represented in data as nodes and edges that connect the nodes, wherein the nodes comprise a first node for a dispatch stage, a second node for an execution stage, and a third node for a commit stage; and
a criticality detector circuit coupled to the memory and to the OOO pipeline, the criticality detector circuit to:
  queue, in the buffer, nodes of a selected micro-operation of the plurality of micro-operations;
  add, to determine a node weight for each node of the nodes of the selected micro-operation, an edge weight to a previous node weight of a connected micro-operation of the plurality of micro-operations that shares an edge with the selected micro-operation and yields a maximum value for the node weight of each node, wherein the node weight of each node comprises a number of execution cycles of the OOO pipeline that are cumulatively summed along nodes and edges from an oldest micro-operation of the plurality of micro-operations, and the edge weight associated with each node comprises a maximum number of execution cycles to execute the connected micro-operation;
  once every predetermined number of micro-operations that defines a size of a history portion of the buffer, identify, as a critical path, a path through the data dependencies of the plurality of micro-operations that yields the maximum value for the node weight of the third node of the selected micro-operation;
  identify, in the data dependencies, one or more second micro-operations on which a critical micro-operation depends, the critical micro-operation being of a certain type and located along the critical path of the data dependencies; and
  store an address of the one or more second micro-operations in the critical IP data structure.

9. The SoC of claim 8, wherein the criticality detector circuit is further to:
detect that the selected micro-operation is to commit;
determine that the connected micro-operation is on the critical path and has an edge between second nodes of the selected micro-operation and the connected micro-operation; and
remove, from the critical IP data structure, any third micro-operation having a second node located in the data dependencies between the selected micro-operation and the connected micro-operation.

10. The SoC of claim 8, wherein the critical micro-operation of the certain type comprises one of a critical load miss, a critical branch, or a critical long-latency arithmetic operation.

11. The SoC of claim 8, wherein the critical micro-operation is a load operation and, to identify the one or more second micro-operations, the criticality detector circuit is further to access an IP pairs data structure to identify a store micro-operation on which the load operation depends.

12. The SoC of claim 8, wherein, to identify the one or more second micro-operations, the criticality detector circuit is further to access a critical branch IP data structure to store addresses of micro-operations, including branches, which have been determined to be critical in the past or due to machine learning performed on the data dependencies.

13. The SoC of claim 8, wherein, to queue nodes of the selected micro-operation, the criticality detector circuit is further to store the node weight of each node of the selected micro-operation with an edge index value, the edge index value indicating which edge to follow to the connected micro-operation to produce the maximum value for the node weight of each node.

14. The SoC of claim 13, wherein to identify the critical path through the data dependencies, the criticality detector circuit is to start at the third node for the selected micro-operation, and trace the critical path along edge index values of respective nodes of the plurality of micro-operations back to a first node of the oldest micro-operation represented within the data dependencies in the buffer.

15. The SoC of claim 8, wherein the criticality detector circuit is further to store the node weight of each node using bits also employed to store values for the edges between second nodes of micro-operations of the plurality of micro-operations.

16. A method comprising:
inserting, by a processor, a selected micro-operation in an instruction queue for allocation in an out-of-order (OOO) pipeline of the processor;
adding, by a criticality detector circuit of the processor, a representation of the selected micro-operation to data dependencies stored in a buffer, wherein the data dependencies are represented in data as nodes and edges, which connect the nodes, of each of a plurality of micro-operations of a program, the nodes comprising a first node for a dispatch stage, a second node for an execution stage, and a third node for a commit stage;

adding, by the criticality detector circuit and to determine a node weight for each node of nodes of the selected micro-operation, an edge weight to a previous node weight of a connected micro-operation of the plurality of micro-operations that shares an edge with the selected micro-operation and yields a maximum value for the node weight of each node, wherein the node weight of each node comprises a number of execution cycles of the OOO pipeline that are cumulatively summed along nodes and edges from an oldest micro-operation of the plurality of micro-operations, and the edge weight associated with each node comprises a maximum number of execution cycles to execute the connected micro-operation; and once every predetermined number of micro-operations that defines a size of a history portion of the buffer, identifying, as a critical path by the criticality detector circuit, a path through the data dependencies of the plurality of micro-operations that yields the maximum value for the node weight of the third node of the selected micro-operation.

17. The method of claim 16, further comprising:
detecting, by the processor, the selected micro-operation entering the OOO pipeline;
determining, by the processor, that reference to the selected micro-operation is stored in a data structure that lists critical micro-operations; and
accelerating, by the processor, execution of the selected micro-operation in response to the reference to the selected micro-operation being located in the data structure.

18. The method of claim 16, further comprising:
determining, by the criticality detector circuit, that the selected micro-operation is stored in a data structure that lists critical micro-operations;
identifying, in the data dependencies, one or more second micro-operations on which a critical micro-operation depends, the critical micro-operation being of a certain type and located along the critical path of the data dependencies; and
storing an address of the one or more second micro-operations in the data structure.

19. The method of claim 16, wherein adding the representation of the selected micro-operation to the data dependencies further comprises storing the node weight of each node of the selected micro-operation with an edge index value, the edge index value indicating which edge to follow to the connected micro-operation to produce the maximum value for the node weight of each node.

20. The method of claim 19, wherein identifying the critical path through the data dependencies comprises:
starting at the third node for the selected micro-operation; and
tracing the critical path along edge index values of respective nodes of the plurality of micro-operations back to a first node of the oldest micro-operation represented within the data dependencies.

21. The method of claim 16, further comprising:
adding references to micro-operations, of the plurality of micro-operations, determined to be located along the critical path to a data structure that lists critical micro-operations;
detecting, by the processor, a second micro-operation entering the OOO pipeline, the second micro-operation following the selected micro-operation in program order of the program;
determining, by the criticality detector circuit, that a reference to the second micro-operation is not stored in the data structure; and
after non-accelerated execution of the second micro-operation within the OOO pipeline, setting a bit flag within the data dependencies to indicate that the second micro-operation is not critical.

22. The method of claim 16, further comprising storing, in a critical instruction pointer (IP) data structure, an address of each micro-operation of the plurality of micro-operations having a second node lying along the critical path.

* * * * *